(12) United States Patent
Nesamoney et al.

(10) Patent No.: US 10,748,173 B2
(45) Date of Patent: Aug. 18, 2020

(54) SCORING USERS BASED ON INTENT FOR ONLINE ADVERTISING

(71) Applicant: Jivox Corporation, San Mateo, CA (US)

(72) Inventors: Diaz Nesamoney, Atherton, CA (US); Sanjay Dahiya, Foster City, CA (US)

(73) Assignee: Jivox Corporation, San Mateo, CA (US)

( * ) Notice: Subject to any disclaimer, the term of this patent is extended or adjusted under 35 U.S.C. 154(b) by 214 days.

(21) Appl. No.: 15/593,097

(22) Filed: May 11, 2017

(65) Prior Publication Data
US 2018/0330398 A1 Nov. 15, 2018

(51) Int. Cl.
*G06Q 30/02* (2012.01)
*G06N 99/00* (2019.01)
*G06N 5/04* (2006.01)
*G06N 20/00* (2019.01)
*G06N 3/08* (2006.01)

(52) U.S. Cl.
CPC .......... *G06Q 30/0244* (2013.01); *G06N 3/08* (2013.01); *G06N 5/04* (2013.01); *G06N 20/00* (2019.01); *G06Q 30/0264* (2013.01); *G06Q 30/0275* (2013.01); *G06Q 30/0277* (2013.01)

(58) Field of Classification Search
USPC ........................................................ 705/319
See application file for complete search history.

(56) References Cited

U.S. PATENT DOCUMENTS

| | | | |
|---|---|---|---|
| 9,514,404 B1 * | 12/2016 | Corrado ................ | G06N 3/0454 |
| 2014/0278972 A1 * | 9/2014 | Yonebahashi ...... | G06Q 30/0255 705/14.53 |
| 2015/0095148 A1 * | 4/2015 | Quigley ............. | G06Q 30/0255 705/14.53 |
| 2015/0142557 A1 * | 5/2015 | Krishnamurthy .. | G06Q 30/0241 705/14.45 |
| 2015/0348137 A1 * | 12/2015 | Flood ................. | G06Q 30/0275 705/14.71 |
| 2016/0191509 A1 * | 6/2016 | Bestler ................ | G06F 12/1408 713/163 |
| 2016/0232548 A1 * | 8/2016 | Grosso ............... | G06Q 30/0283 |

OTHER PUBLICATIONS

Online Model Evaluation in a Large-Scale Computational Advertising Platform, Shahriar Shariat • Burkay Orten • Ali Dasdan, Nov. 1, 2015 (Year: 2015).*
Performance Study of Classification Algorithms for Consumer Online Shopping Attitudes and Behavior Using Data Mining,Rana Alaa El-Deen Ahmeda • M. Elemam Shehaba • Shereen Morsya • Nermeen Mekawiea, Apr. 1, 2015 (Year: 2015).*

* cited by examiner

*Primary Examiner* — Gautam Ubale
(74) *Attorney, Agent, or Firm* — Perkins Coie LLP

(57) ABSTRACT

An intent score is assigned to users who are viewing online ads. Users define a bid-range and adjust pricing within the range at an individual user level, based on an intent score that is derived from user activity. An advertiser typically defines a bid range. If the user then interacts with ads or visits the advertiser's website then, based on user actions, the bid price is revised. This process of bid price revision is continuous and results in increased or decreased bid prices for individual users. All participating users and their intent scores are periodically uploaded to RTB platforms where they are used to purchase ad impressions. This increases the likelihood of winning bids for more valuable users with better precision without raising bid prices for entire segments of users.

21 Claims, 5 Drawing Sheets

SCORING USERS BASED ON INTENT FOR ONLINE ADVERTISING

FIELD

Various of the disclosed embodiments concern online advertising. More specifically, embodiments of the invention concern scoring users based on intent for online advertising.

BACKGROUND

Real-time bidding (RTB) is a means by which advertising inventory is bought and sold on a per-impression basis, via programmatic instantaneous auction, similar to financial markets. With real-time bidding, advertising buyers bid on an impression and, if the bid is won, the buyer's ad is instantly displayed on the publisher's site. Real-time bidding lets advertisers manage and optimize ads from multiple ad networks by granting the user access to a multitude of different networks, allowing them to create and launch advertising campaigns, prioritize networks, and allocate percentages of unsold inventory, known as backfill.

A typical transaction begins with a user visiting a website. The user visit to the website triggers a bid request that can include various pieces of data such as the user's demographic information, browsing history, location, and the page being loaded. The request goes from the publisher to an ad exchange, which submits it and the accompanying data to multiple advertisers who automatically submit bids in real time to place their ads. Advertisers bid on each ad impression as it is served. The impression goes to the highest bidder and their ad is served on the page. This process is repeated for every ad slot on the page.

Currently, real-time bidding platforms that are used for online advertising divide target users into multiple user segments and assign bid prices for each segment. User segments and corresponding bid prices are typically assigned manually by campaign managers prior to campaign launch. Generally, a large number of users (in millions) belong to one segment and share the same bid price.

SUMMARY

Embodiments of the invention provide a method and apparatus for assigning the intent score to users who are viewing online ads. Embodiments of the invention allow users to define a bid-range and adjust pricing within the range at an individual user level, based on an intent score that is derived from user activity. An advertiser typically defines a bid range. If the user then interacts with ads or visits the advertiser's website then, based on user actions, the bid price is revised. This process of bid price revision is continuous and results in increased or decreased bid prices for individual users. All participating users and their intent scores are periodically uploaded to RTB platforms where they are used to purchase ad impressions. This increases the likelihood of winning bids for more valuable users with better precision without raising bid prices for entire segments of users.

DRAWINGS

DETAILED DESCRIPTION

Embodiments of the invention provide a method and apparatus for assigning the intent score to users who are viewing online ads. Embodiments of the invention allow users to define a bid-range and adjust pricing within the range at an individual user level, based on an intent score that is derived from user activity. An advertiser typically defines a bid range. An example bid range could be between 0.1 and 0.4 cents for each online ad based on intent of the user. A user who has never interacted with any of advertiser's online services would be assigned a bid price of 0.1. If the user then interacts with ads or visits the advertiser's website then, based on user actions, the bid price is revised, e.g. to 0.21 cents. This process of bid price revision is continuous and results in increased or decreased bid prices for individual users. An example of a decrease in bid price is a user purchasing a product or service. In this case, a user is not considered to be interested in purchasing again and the bid price would be reset to 0. All participating users and their intent scores are periodically uploaded to RTB platforms where they are used to purchase ad impressions. This increases the likelihood of winning bids for more valuable users with better precision without raising bid prices for entire segments of users.

Figure 1:
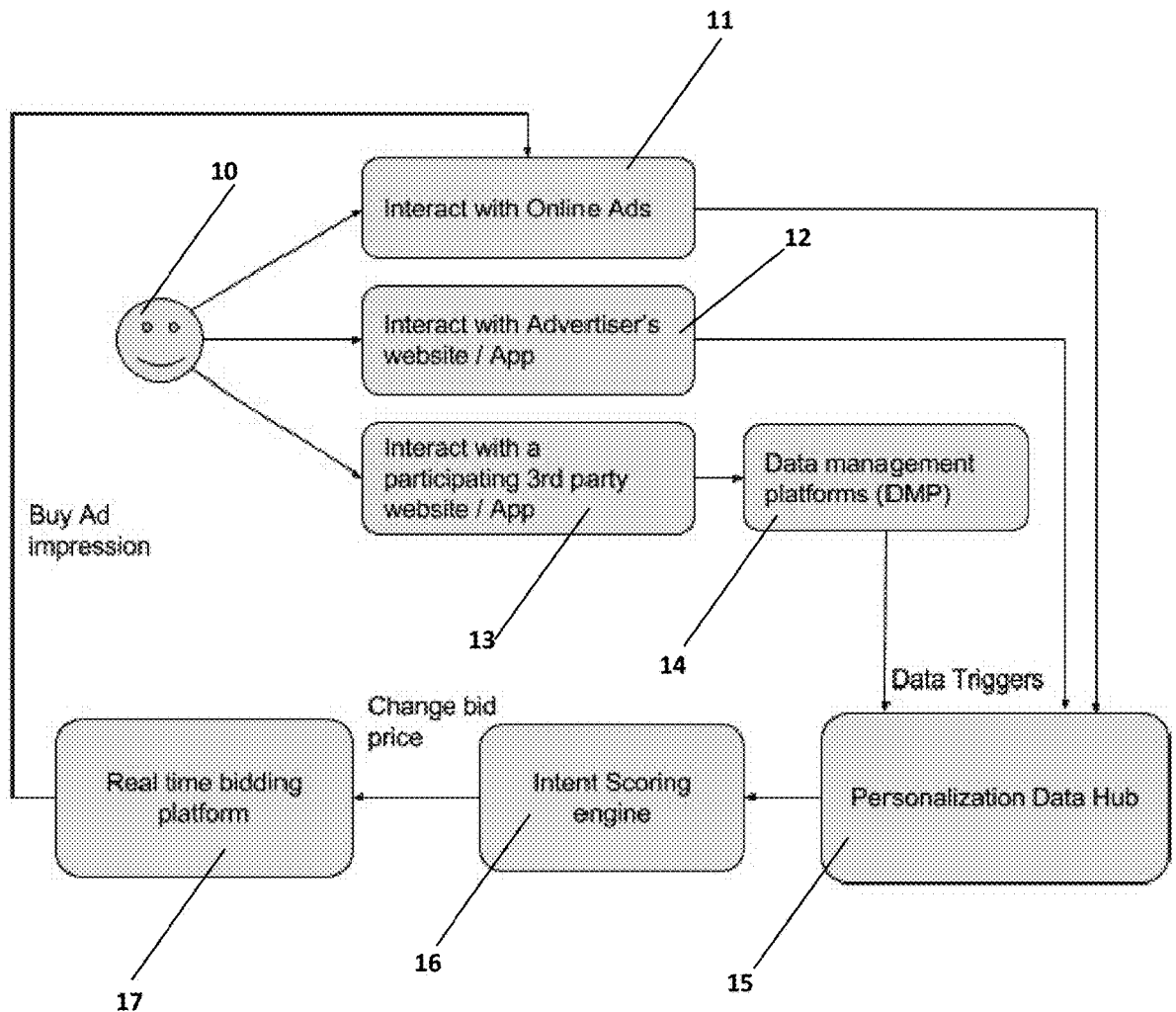
FIG. 1 is a block diagram showing a system for scoring users based on intent for online advertising according to the invention.

FIG. 1 is a block diagram showing a system for scoring users 10 based on intent for online advertising according to the invention. The intent score is used to dynamically adjust the bid price for individual users in a real-time bidding platform for online advertising. Embodiments of the invention use real-time data triggers from data collected from a number of heterogeneous sources, and apply decision rules defined by the scoring configuration, e.g. in Table 1 discussed below, and machine intelligence to this data to arrive at an intent score for each user. This score is recalculated whenever any new user event is received or at specific time intervals. These scores are then used to the adjust the bid price for ad impressions in supported RTB platforms 17.

Embodiments of the invention generate real-time data triggers from user activity across multiple services including, but not limited to, the ads they view and interact with 11, 13, activity on advertiser's website 12, data shared by third party providers, e.g. data management platforms (DMPs) 14, and environmental data, such as weather patterns. This is achieved by mapping user activity data from different online services to the same anonymized identifier, referred to herein as a "pseudo Id." These identifiers are purely anonymized and cannot be used to get any personally identifiable information about any user. All data associated with same pseudo Id is imported and maintained in a high performance in-memory data store, referred to herein as a personalization hub 15, that allows near real-time updates.

Any change in user's data generates a data trigger, which causes the intent score to be recalculated by an intent scoring engine 16 for that user.

Personalization Hub

Figure 2:
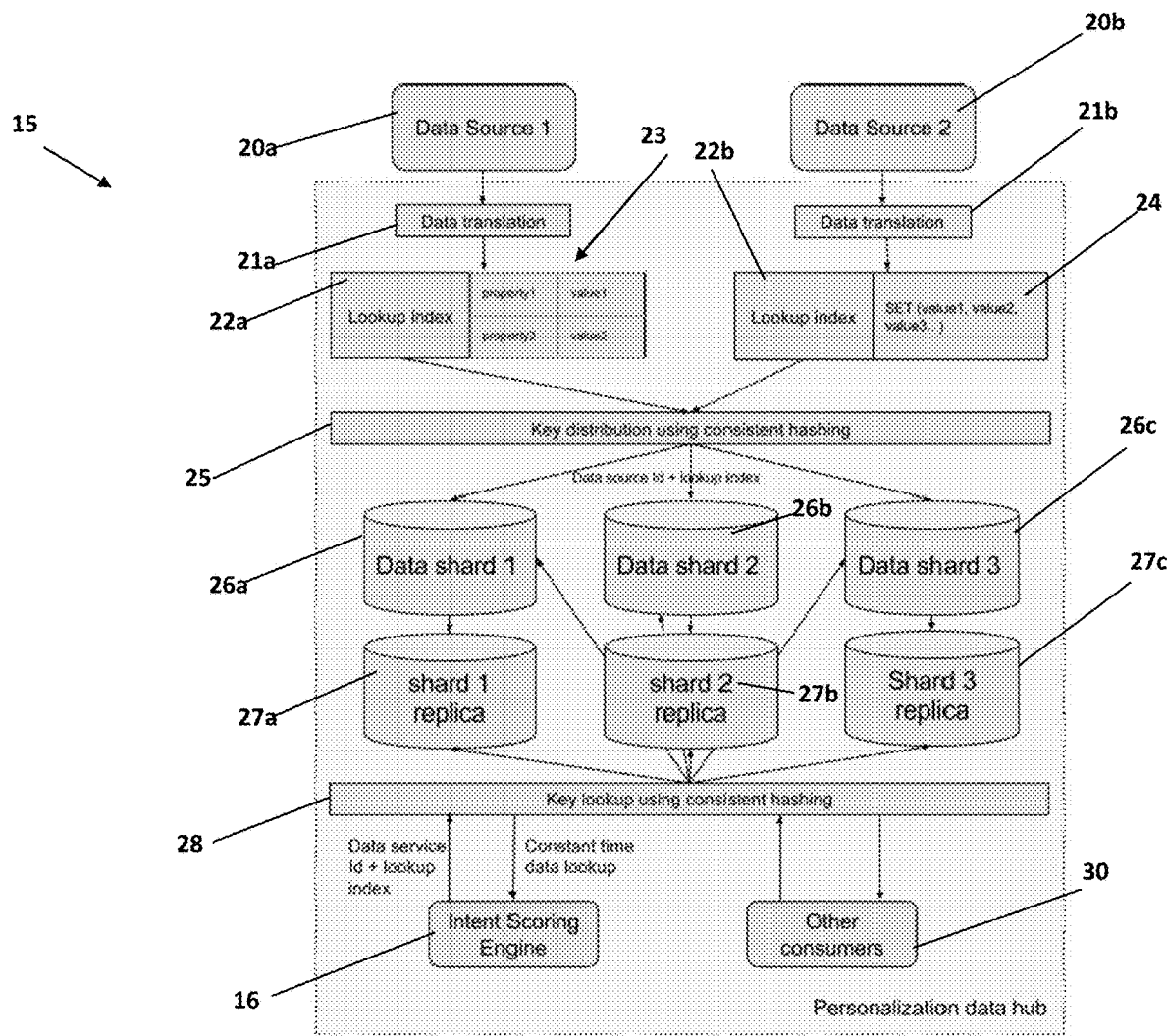
FIG. 2 is a block diagram showing a personalization hub according to the invention.

FIG. 2 is a block diagram showing a personalization hub according to the invention. The personalization hub 15 is a distributed in-memory data store that allows near real-time updates and lookup capability. It allows storing data from multiple heterogeneous data sources, such as user profiles based on pseudo Ids, weather data based on postal codes, etc.

Data from each data source 20a, 20b is converted to one of following three structures using data translation layer 21a, 21b:
- key=value pairs
- SET of unique unordered values
- LIST of ordered values All value structures are assigned a unique lookup index 22a, 22b. The lookup index and type of structure is dependent on data source. For example, key and value pairs 23 are used for user profile data, where the lookup index is the userId and the value is a SET of unique profile segments and for weather data, where the lookup index is the postal code and the value is a SET of key value pairs, e.g. (temperature=70, wind-speed=30, condition=sunny, pollen=low); and data sets 24 are used for user's interactions with advertiser's website, the data is stored as a LIST of recently viewed product Ids.

The data is then distributed using a consistent hashing algorithm 25 applied to lookup keys across a large array of server shards 26a, 26b, 26c. Within each shard a secondary hashing algorithm 28 is used to maintain data records. Each shard is then replicated to a redundant server 27a, 27b, 27c for failover. The use of two level hashing provides constant time lookup performance over a multi-terabyte data store spread across a very large number of servers.

Data for the personalization hub is provided to the intent scoring engine 16 and to other consumers of data as well 30. Other consumers of this data include an ad personalization engine that changes the contents of ads served to each user dynamically based on the users' past actions.

Intent Scoring Engine

Figure 3:
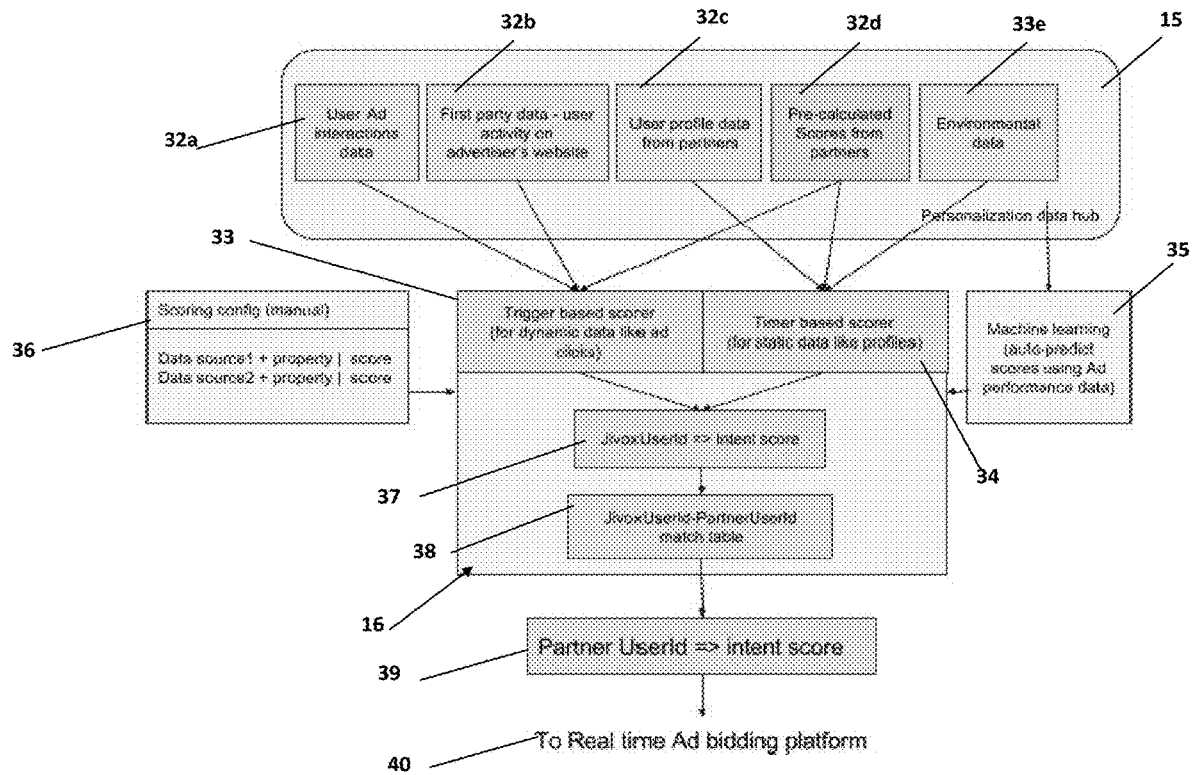
FIG. 3 is a block diagram showing an intent scoring engine according to the invention.

FIG. 3 is a block diagram showing an intent scoring engine according to the invention. The intent score is calculated based on an ad campaign specific scoring configuration, as well as using machine learning from user ad interaction data. User interaction data is stored in personalization hub and is updated in near real-time as users interact with participating online service.

The intent scoring engine 16 can be operated in manual configurations 36 or in an automated fashion using machine learning 35 to predict scores. Score generation is initiated by timers 34 or data based triggers 33, received from the personalization hub. Timer based triggers allow generating scores based on static data that may not change frequently during the lifetime of an ad, e.g. user profiles 32c imported from a DMP, pre-calculated scores 32d, and environmental data 33e. Data triggers allow updating user intent scores frequently as new intent data is received from ad tracking 32a, advertiser's websites 32b, or other sources.

Embodiments of the invention allow configuring intent of individual data triggers to manually control the scoring configuration. In embodiments of the invention, the score for a user is calculated in a range of 0 to 100, although other ranges may readily be used in connection with the invention. For users with large amounts of activity a scaling function is used to restrict values within the range. Table 1 shows a sample scoring configuration.

TABLE 1

Sample Scoring Configuration

| Trigger source | Trigger type | Intent score |
| --- | --- | --- |
| Campaign | click | 10 |
| Advertiser's website | Product view | 20 |
| 3rd party data source (DMP) | User added to segment | 10 |
| Campaign data | conversion | −20 |

As an advanced alternative to manually configuring intent score, campaign data is fed back to a machine learning model 35 that can automatically derive intent scores based on behavior of a large number of users.

Figure 4:
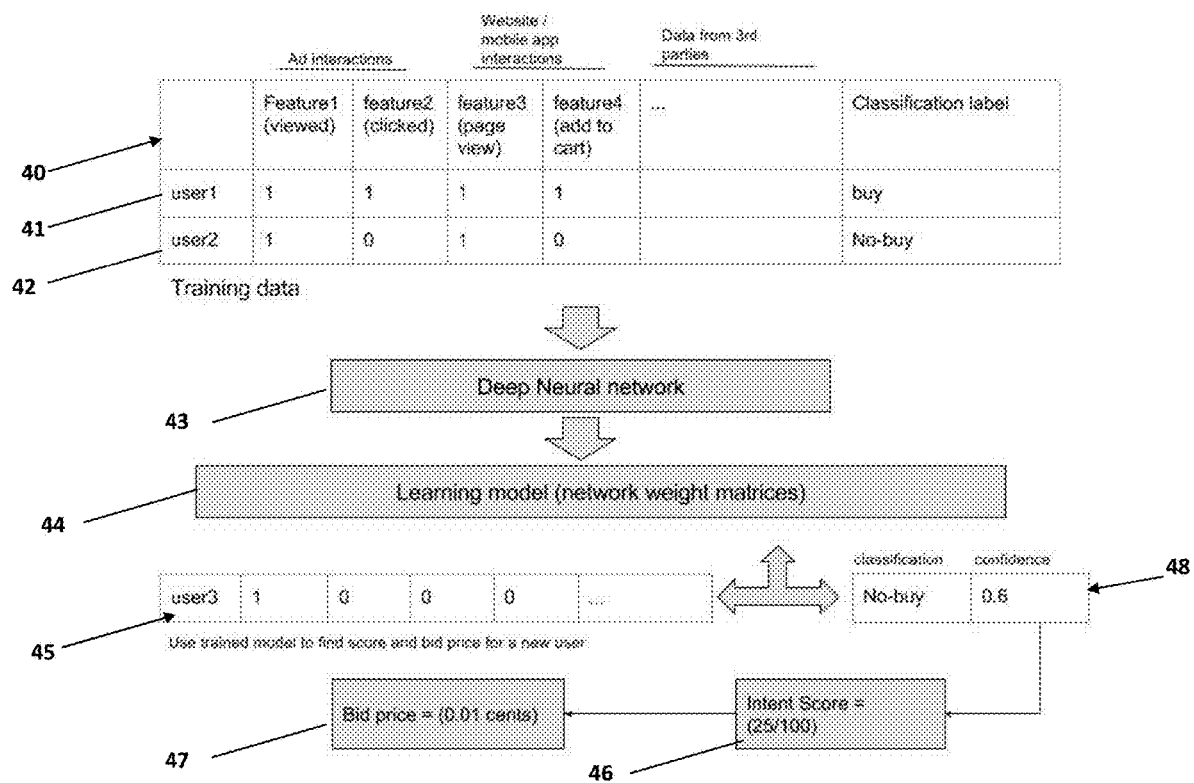
FIG. 4 is a block diagram showing a machine learning model according to the invention.

FIG. 4 is a block diagram showing a machine learning model according to the invention. In embodiments of the invention, a two-stage machine-learning algorithm is used to derive scores automatically. A first stage of the algorithm uses a deep neural network based classification algorithm 43 and historical data 40, e.g. for a plurality of users 41, 42, to determine if a user is likely to perform the target action, e.g. purchasing a product or service; and a second stage of the algorithm uses a learning model (discussed below).

The deep learning network can be setup to produce both a classification and a confidence score. In this case, if the algorithm classifies a user positively then the confidence score is used to derive the intent score by projecting the confidence score over the bid range. When using machine learning, one or more optimization targets are specified. The optimization target is defined by an advertiser, e.g. if the goal of an ad campaign is to drive traffic to an advertiser's website, then users visiting advertiser's website would be the optimization target.

Data for all users who meet the optimization target is used for learning. Machine learning algorithms automatically identify a most influential data parameter contributing to meeting the optimization target and consequently increase the intent score for those users. For example, if the optimization target is to increase click-through rate, learning begins with the set of users who clicked on an ad. Machine learning identifies common parameters from these users 37 (see FIG. 3) and finds other users with similar parameters 38. The intent score for similar users is increased 39 to allow the purchase of impressions for these users, for example via a real-time ad bidding platform 40. The algorithm regenerates the predictive model periodically to adapt to any changes in user behavior.

As shown in FIG. 4, in this embodiment of the invention training data 40 includes all users whose activity is known at the time of training. The deep learning network is trained using this data to build the learning model 44 which then classifies users in 'buy' and 'no-buy' classes, although the invention is readily applicable to place user in other classes. When a new user 45 is seen, the network generates a 'buy' or 'no-buy' prediction along with a confidence measure 48. The confidence measure is then mapped to an Intent score 46, which subsequently decides a bid price 47 for that user. Weight matrices are generated during training and change over a period of time as data changes.

Computer System

Figure 5:
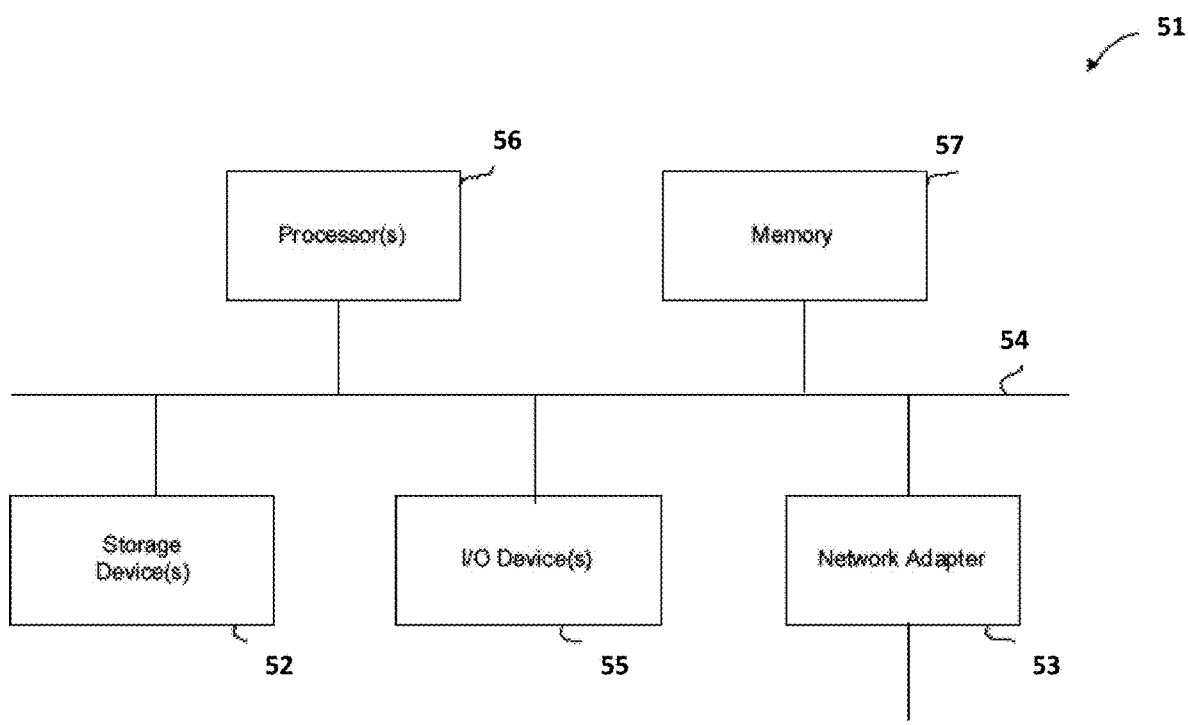
FIG. 5 shows a diagrammatic representation of a machine in the example form of a computer system within which a set of instructions for causing the machine to perform one or more of the methodologies discussed herein may be executed.

FIG. 5 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 51 may include one or more central processing units ("processors") 56, memory 57, input/output devices 55, e.g. keyboard and pointing devices, touch devices, display devices, storage devices 52, e.g. disk drives, and network adapters 53, e.g. network interfaces, that are connected to an interconnect 54. The interconnect is illustrated as an abstraction that represents any one or more separate physical buses, point to point connections, or both connected by appropriate bridges, adapters, or controllers. The interconnect, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory and storage devices are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer readable transmission media.

The instructions stored in memory can be implemented as software and/or firmware to program the processor to carry out actions described above. In some embodiments, such software or firmware may be initially provided to the processing system by downloading it from a remote system through the computing system 300, e.g. via network adapter.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A computer implemented method for scoring users based on intent for online advertising, comprising:
   a processor identifying individual activity in connection with a website;
   said processor generating real-time data triggers from data collected from a plurality of heterogeneous sources including user activity across a plurality of services including any of ads said users view and interact with, and users' activity on an advertiser's website;
   said processor obtaining a machine learning algorithm trained to classify said users in 'buy' and 'no-buy' classes based on said real-time data triggers, wherein the machine learning algorithm includes a two-stage machine learning algorithm, wherein a first stage of the two-stage machine learning algorithm uses a deep neural network based classification algorithm and historical data for said users to determine if a user is likely to perform a target action;
   said processor, using said deep neural network, producing both a classification score and a confidence measure by generating a 'buy' or 'no-buy' prediction along with the confidence measure when a new user is seen, based on real-time data triggers associated with the new user including any of ads the new user views and interacts with, and the new user's activity on the advertiser's website; and
   said processor, using said deep neural network, calculating a bid price for the new user by projecting the confidence measure over an advertiser defined bid range to derive an intent score when said new user is classified positively.

2. The method of claim 1, further comprising: said processor periodically uploading all participating users and their intent scores to one or more real time bidding platforms for use in purchasing ad impressions to increase a likelihood of winning bids for more valuable users with better precision without raising bid prices for an entire segments of users.

3. The method of claim 1, wherein any change in a user's data generates a data trigger, said data trigger causing said intent score to be recalculated for said user by an intent scoring engine.

4. The method of claim 1, said processor generating said real-time data triggers further comprising:
   said processor converting data from each data source to a value structure comprising one of key-value pairs, a SET of unique unordered values, and a LIST of ordered values;
   said processor assigning a unique lookup index to all value structures, wherein said unique lookup index and a type of structure is data source dependent; said processor using a consistent hashing algorithm applied to lookup keys across a large array of server shards to distribute said data; and
   within each shard, said processor using a secondary hashing algorithm to maintain data records, wherein said two level hashing provides constant time lookup performance over a multi-terabyte data store spread across a large number of servers.

5. The method of claim 4, further comprising:
   said processor replicating each shard to a redundant server for failover.

6. The method of claim 4, further comprising:
   said processor using said value structures for any of:
   user profile data, where said unique lookup index is a userId and a value is a SET of unique profile segments;
   weather data, where said unique lookup index is a postal code and the value is a SET of key value pairs; and
   user interactions with advertiser websites, where the data is stored as a LIST of recently viewed product Ids.

7. The method of claim 1, further comprising:
   said processor calculating said intent score based on an ad campaign specific scoring configuration and machine learning from user ad interaction data.

8. The method of claim 1, further comprising:
   said processor mapping user activity data from said plurality of services to an anonymized identifier (pseudo Id);
   wherein said pseudo Id cannot be used to get any personally identifiable information about any user;

wherein all data associated with a same pseudo Id is imported and maintained in a high performance in-memory data store (personalization hub) for near real-time update; and said processor providing data from said personalization hub to an intent scoring processor.

9. The method of claim 8, further comprising:

an intent scoring engine using any of timers and data based triggers received from said personalization hub to initiate score generation.

10. The method of claim 9, further comprising:

said intent scoring engine using said timers to generate scores based on static data that may not change frequently during a lifetime of an ad, said static data comprising any of user profiles imported from a data management platform, pre-calculated scores, and environmental data.

11. The method of claim 9, further comprising:

said intent scoring engine using said data based triggers to update user intent scores when new intent data is received from any of ad tracking, advertiser's websites, and other sources.

12. The method of claim 9, further comprising:

said intent scoring engine configuring intent of individual data triggers to manually control an intent scoring configuration.

13. The method of claim 1, further comprising:

an intent scoring engine using a scaling function for users with large amounts of activity to restrict values within the advertiser defined bid range.

14. The method of claim 1, further comprising:

an intent scoring engine feeding back campaign data to a machine learning model; said machine learning model automatically deriving intent scores based on behavior of a large number of users.

15. The method of claim 1, further comprising:

a machine-learning algorithm specifying an optimization target defined by an advertiser.

16. The method of claim 15, further comprising:

said machine-learning algorithm using users visiting said advertiser's website as said optimization target when an ad campaign goal is to drive traffic to said advertiser's website.

17. The method of claim 15, further comprising:

said machine-learning algorithm using data for all users who meet the optimization target for learning.

18. The method of claim 15, further comprising:

said machine-learning algorithm beginning learning with a set of users who clicked on an ad when the optimization target is to increase click-through rate by:

identifying common parameters from said set of users and finding other users with similar parameters;

increasing said intent score for similar users to allow purchase of impressions for these users via a real-time ad bidding platform; and regenerating a predictive model periodically to adapt to any changes in user behavior.

19. The method of claim 1, further comprising:

said machine learning algorithm automatically identifying a most influential data parameter contributing to meeting an optimization target and increasing the intent score for those users.

20. The method of claim 1, further comprising:

said machine learning algorithm using training data that includes all users whose activity is known at a time of training.

21. An apparatus for scoring users based on intent for online advertising, comprising:

a processor that executes instructions stored in a non-transitory data storage device to:

identify individual activity in connection with a website;

generate real-time data triggers from data collected from a plurality of heterogeneous sources;

obtain a machine learning algorithm trained to classify said users in 'buy' and 'no-buy' classes based on said real-time data triggers, wherein the machine learning algorithm includes a two-stage machine learning algorithm, wherein a first stage of the two-stage machine learning algorithm uses a deep neural network based classification algorithm and historical data for said users to determine if a user is likely to perform a target action;

produce both a classification score and a confidence measure by generating, using the machine learning algorithm, a 'buy' or 'no-buy' prediction along with the confidence measure when a new user is seen, based on real-time data triggers associated with the new user including any of ads the new user views and interacts with, and the new user's activity on an advertiser's website; and calculate a bid price for the new user by projecting the confidence measure over an advertiser defined bid range to derive an intent score when said new user is classified positively.

* * * * *